United States Patent
Kling et al.

(10) Patent No.: US 10,003,598 B2
(45) Date of Patent: Jun. 19, 2018

(54) MODEL FRAMEWORK AND SYSTEM FOR CYBER SECURITY SERVICES

(71) Applicant: BANK OF AMERICA CORPORATION, Charlotte, NC (US)

(72) Inventors: John Howard Kling, Cincinnati, OH (US); Mark Earl Brubaker, Simi Valley, CA (US); Cora Yan Quon, Los Angeles, CA (US); Rachel Yun Kim Bierner, Los Angeles, CA (US); Armen Moloian, Lake Arrowhead, CA (US); Ronald James Kuhlmeier, Simi Valley, CA (US)

(73) Assignee: Bank of America Corporation, Charlotte, NC (US)

( * ) Notice: Subject to any disclaimer, the term of this patent is extended or adjusted under 35 U.S.C. 154(b) by 134 days.

(21) Appl. No.: 15/099,654

(22) Filed: Apr. 15, 2016

(65) Prior Publication Data
US 2017/0302668 A1    Oct. 19, 2017

(51) Int. Cl.
*H04L 29/06*    (2006.01)

(52) U.S. Cl.
CPC .......... *H04L 63/10* (2013.01); *H04L 63/1416* (2013.01)

(58) Field of Classification Search
CPC ............................ H04L 63/10; H04L 63/1463
See application file for complete search history.

(56) References Cited

U.S. PATENT DOCUMENTS

| | | | |
|---|---|---|---|
| 5,345,595 A | 9/1994 | Johnson et al. |
| 5,905,859 A | 5/1999 | Holloway et al. |
| 5,991,881 A | 11/1999 | Conklin et al. |
| 6,088,804 A | 7/2000 | Hill et al. |
| 6,119,236 A | 9/2000 | Shipley et al. |
| 6,279,113 B1 | 8/2001 | Vaidya |
| 6,298,445 B1 | 10/2001 | Shostack et al. |
| 6,301,668 B1 | 10/2001 | Gleichauf et al. |

(Continued)

OTHER PUBLICATIONS

The STRIDE Threat Model, retrieved from the internet on Sep. 6, 2016, https://msdn.microsoft.com/enus/library/ee823878(v=cs.20).aspx, 1 pages.

(Continued)

*Primary Examiner* — Ellen Tran
(74) *Attorney, Agent, or Firm* — Michael A. Springs; Moore & Van Allen PLLC; Anup Shrinivasan (57) ABSTRACT

Systems, computer program products, and methods are described herein for a model framework and system for cyber security services. The present invention is configured to determine one or more access paths to the internal computing device from an external computing device; determine one or more controls associated with each access path; determine one or more types of access that may be made via one or more of the access paths by the external computing device to access the internal computing device; determine whether the one or more controls associated with the at least one of the one or more access paths is capable of detecting the access; determine one or more tools configured to regulate the one or more controls; and incorporate the one or more tools within the network to regulate the one or more controls to detect and monitor the access.

14 Claims, 3 Drawing Sheets

(56) References Cited

U.S. PATENT DOCUMENTS

| | | |
|---|---|---|
| 6,347,374 B1 | 2/2002 | Drake et al. |
| 6,363,489 B1 | 3/2002 | Comay et al. |
| 6,381,242 B1 | 4/2002 | Maher, III et al. |
| 6,578,147 B1 | 6/2003 | Shanklin et al. |
| 6,631,416 B2 | 10/2003 | Bendinelli et al. |
| 6,704,874 B1 | 3/2004 | Porras |
| 6,735,701 B1 | 5/2004 | Jacobson |
| 6,772,345 B1 | 8/2004 | Shetty |
| 6,789,203 B1 | 9/2004 | Belissent |
| 6,839,850 B1 | 1/2005 | Campbell et al. |
| 6,910,135 B1 | 6/2005 | Grainger |
| 6,957,067 B1 | 10/2005 | Lyer et al. |
| 6,988,208 B2 | 1/2006 | Hrabik et al. |
| 7,181,766 B2 | 2/2007 | Bendinelli et al. |
| 7,225,188 B1 | 5/2007 | Gai et al. |
| 7,493,659 B1 | 2/2009 | Wu et al. |
| 7,506,155 B1 | 3/2009 | Stewart et al. |
| 8,015,091 B1 | 9/2011 | Ellis |
| 8,595,176 B2 | 11/2013 | Wang et al. |
| 8,914,406 B1 * | 12/2014 | Haugsnes ............ H04L 67/1097 382/305 |
| 9,509,712 B2 | 11/2016 | Pinney Wood et al. |
| 9,516,041 B2 | 12/2016 | Baikalov et al. |
| 9,516,054 B2 | 12/2016 | Malachi |
| 9,531,738 B2 | 12/2016 | Zoldi et al. |
| 9,537,879 B2 | 1/2017 | Blackwell |
| 9,560,066 B2 | 1/2017 | Visbal |
| 9,565,204 B2 | 2/2017 | Chesla |
| 9,571,512 B2 | 2/2017 | Ray et al. |
| 9,584,536 B2 | 2/2017 | Nantel |
| 9,596,256 B1 | 3/2017 | Thomson et al. |
| 2004/0006704 A1 | 1/2004 | Dahlstrom et al. |
| 2004/0221176 A1 | 11/2004 | Cole |
| 2005/0066195 A1 | 3/2005 | Jones |
| 2005/0193430 A1* | 9/2005 | Cohen ................... G06F 21/577 726/25 |
| 2007/0180107 A1 | 8/2007 | Newton et al. |
| 2007/0226796 A1 | 9/2007 | Gilbert et al. |
| 2009/0024627 A1 | 1/2009 | King |
| 2011/0138471 A1 | 6/2011 | Van de Weyer et al. |
| 2011/0161848 A1 | 6/2011 | Purcell et al. |
| 2011/0288692 A1 | 11/2011 | Scott |
| 2013/0307682 A1 | 11/2013 | Jerhotova et al. |
| 2014/0189098 A1 | 7/2014 | MaGill et al. |
| 2014/0237594 A1 | 8/2014 | Thakadu et al. |
| 2014/0380484 A1 | 12/2014 | Choi et al. |
| 2015/0033337 A1 | 1/2015 | Baikalov et al. |
| 2015/0033341 A1 | 1/2015 | Schmidtler et al. |
| 2016/0182559 A1 | 6/2016 | Francy et al. |
| 2016/0359895 A1 | 12/2016 | Chiu et al. |
| 2017/0013011 A1 | 1/2017 | Renouil et al. |
| 2017/0063917 A1 | 3/2017 | Chesla |
| 2017/0085588 A1 | 3/2017 | Laidlaw et al. |

OTHER PUBLICATIONS

Wikipedia, the Free Encyclopedia, retrieved from the internet on Sep. 6, 2016, https://en.wikipedia.org/wiki/Factor_analysis_of_information_risk, 4 pages.

* cited by examiner

MODEL FRAMEWORK AND SYSTEM FOR CYBER SECURITY SERVICES

BACKGROUND

With the growth in Internet, securing technology resources has become an integral part of computer and information security. Typically, securing technology resources includes measures adopted to protect the resources and consequently, the integrity of a computer network. Breaches in technology resources typically results in loss of information such as customer and client information, payment information, personal files, account details, which can be detrimental to both the entity and the customer involved. There is a need for a model framework and system for cyber security services to monitor and control access to resources within an entity cyberspace.

BRIEF SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a model framework and system for cyber security services is presented. The system comprises at least one non-transitory storage device; at least one processor; and at least one module stored in said storage device and comprising instruction code that is executable by the at least one processor and configured to cause said at least one processor to: electronically receive, via a distributed network of servers, information associated with an internal computing device within a network; determine one or more access paths to the internal computing device from an external computing device; determine one or more controls associated with each of the one or more access paths associated with the internal computing device, wherein the one or more controls are configured to determine access to the internal computing device; determine one or more types of access that may be made via one or more of the access paths by the external computing device to access the internal computing device; determine whether the one or more controls associated with the at least one of the one or more access paths is capable of detecting the access by the external computing device via at least one of the one or more types of access; determine one or more tools configured to regulate the one or more controls to monitor the accessing of the internal computing device, wherein the one or more tools comprises one or more capabilities to facilitate the regulation of the one or more controls to detect and prohibit access to the internal computing device via at least one of the one or more types of access; and incorporate the one or more tools within the network to regulate the one or more controls to detect and monitor the accessing of the internal computing device by the external computing device via at least one of the one or more types of access.

In some embodiments, the module is further configured to cause the at least one processor to: determine that the one or more controls associated with at least one of the one or more access paths is not capable of detecting the access by the external computing device via at least one of the one or more types of access, wherein determining further comprises determining that the one or more controls is not capable of regulating one or more conditions associated with the one or more types of access.

In some embodiments, the module is further configured to cause the at least one processor to: determine one or more capabilities associated with the one or more types of access, the one or more types of access incapable of being regulated by the one or more controls; identify one or more tools based on at least the one or more determined capabilities, wherein the one or more identified tools facilitate the regulation of the one or more controls to detect and prohibit access to the internal computing device via at least one of the one or more types of access; and incorporate the one or more identified tools within the network to regulate the one or more controls to detect and monitor the accessing of the internal computing device by the external computing device via at least one of the one or more types of access previously not capable of detecting the access.

In some embodiments, the module is further configured to cause the at least one processor to: determine that access to the internal computing device by the external computing device via at least one of the one or more types of access causes a loss event; determine a probability score associated with the loss event, wherein the probability score indicates the chances of occurrence of the loss event; determine a magnitude of impact score associated with the loss event, wherein the magnitude of impact score indicates a consequence of the loss event; and determine an exposure score associated with the loss event based on at least the probability score and the magnitude of impact score.

In some embodiments, the one or more controls are configured to be regulated to detect and prohibit access to the internal computing device via at least one of the one or more types of access, thereby reducing the exposure score associated with the loss event.

In some embodiments, the module is further configured to cause the at least one processor to: determine that the exposure score associated with the loss event is greater than a predetermined threshold; determine one or more capabilities associated with the one or more types of access, the one or more types of access incapable of being regulated by the one or more controls; identify one or more tools based on at least the one or more determined capabilities, wherein the one or more identified tools facilitate the regulation of the one or more controls to detect and prohibit access to the internal computing device by the external computing device; and incorporate the one or more identified tools within the network to regulate the one or more controls to detect and prohibit access to the internal computing device by the external computing device, wherein the incorporation of the one or more identified tools results in the exposure score associated with the loss event to be lower than the predetermined threshold.

In some embodiments, the module is further configured to cause the at least one processor to: determine that a first tool identified to facilitate the regulation of the one or more controls comprises one or more capabilities that overlap with the capabilities of a second tool also identified to facilitate the regulation of the one or more controls, wherein the first tool and the second tool associated with the one or more tools identified; initiate a presentation of a user interface to enable a user to select the first tool or the second tool for the one or more overlapped capabilities; receive a user input comprising the selection of the first tool and/or the second tool for the one or more overlapped capabilities; and incorporate the first tool and the second tool within the network to regulate the one or more controls to detect and prohibit access to the internal computing device by the external computing device.

In another aspect, a computerized method for a model framework and system for cyber security services is presented. The method comprises: electronically receiving, via a distributed network of servers, information associated with an internal computing device within a network; determining, using a computing device processor, one or more access paths to the internal computing device from an external computing device; determining, using a computing device processor, one or more controls associated with each of the one or more access paths associated with the internal computing device, wherein the one or more controls are configured to determine access to the internal computing device; determining, using a computing device processor, one or more types of access that may be made via one or more of the access paths by the external computing device to access the internal computing device; determining, using a computing device processor, whether the one or more controls associated with the at least one of the one or more access paths is capable of detecting the access by the external computing device via at least one of the one or more types of access; determining, using a computing device processor, one or more tools configured to regulate the one or more controls to monitor the accessing of the internal computing device, wherein the one or more tools comprises one or more capabilities to facilitate the regulation of the one or more controls to detect and prohibit access to the internal computing device via at least one of the one or more types of access; and incorporating, using a computing device processor, the one or more tools within the network to regulate the one or more controls to detect and monitor the accessing of the internal computing device by the external computing device via at least one of the one or more types of access.

In yet another aspect, a computer program product for a model framework and system for cyber security services is presented. The computer program product comprising a non-transitory computer-readable medium comprising code causing a first apparatus to: electronically receive, via a distributed network of servers, information associated with an internal computing device within a network; determine one or more access paths to the internal computing device from an external computing device; determine one or more controls associated with each of the one or more access paths associated with the internal computing device, wherein the one or more controls are configured to determine access to the internal computing device; determine one or more types of access that may be made via one or more of the access paths by the external computing device to access the internal computing device; determine whether the one or more controls associated with the at least one of the one or more access paths is capable of detecting the access by the external computing device via at least one of the one or more types of access; determine one or more tools configured to regulate the one or more controls to monitor the accessing of the internal computing device, wherein the one or more tools comprises one or more capabilities to facilitate the regulation of the one or more controls to detect and prohibit access to the internal computing device via at least one of the one or more types of access; and incorporate the one or more tools within the network to regulate the one or more controls to detect and monitor the accessing of the internal computing device by the external computing device via at least one of the one or more types of access.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. For clarity, non-essential elements may have been omitted from some of the drawing.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, or the like) or multiple pieces of hardware. Similarly, the programs may be standalone programs, may be incorporated as subroutines in an operating system, may be functions in an installed software package, and the like.

The present invention boasts a complex framework and system to leverage conceptual and logical data models for identifying and connecting cyber security services capabilities taxonomy. The present invention provides the functional benefit of utilizing the taxonomy of the services through conceptual and logical data models to determine all the services necessary to complete a client-customer service request.

Network security consists of the policies adopted to prevent and monitor unauthorized access, misuse, modification, or denial of a computer network and network-accessible resources. In other words, network security involves the authorization of access to an asset (e.g. data) in a network, which is controlled by the network administrator. Users choose or are assigned an ID and password or other authenticating information that allows them access to information and programs within their authority. Network security covers a variety of computer networks, both public and private, that are used in everyday jobs; conducting transactions and communications among businesses, government agencies and individuals. Networks can be private, such as within a company, and others which might be open to public access. Network security is involved in organizations, enterprises, and other types of institutions.

Cyberspace/network security is faced with the challenge of protecting assets (e.g., devices, data, networks, and any other resources key to the functioning of the entity's cyberspace) of a network from both passive and active intrusions. In some embodiments, an "entity" as used herein may refer to an organization comprising multiple individuals such as an institution or an association that has a collective goal and external environment. Typically, organizations have a management structure that determines relationships between different activities and the members, and subdivides and assigns roles, responsibilities, and authority to carry out different tasks. For purposes of the invention, resources may indicate one or more hardware and/or software available to the user and enables the user to work towards the collective goal of the entity. Typically, a passive intrusion as a network intrusion in which a system is monitored and sometimes scanned for open ports and vulnerabilities. The intrusion is considered "passive" when a network intruder intercepts network traffic within a network. In this regard, passive attacks include traffic analysis, monitoring of unprotected communications, decrypting weekly encrypted traffic, and capturing authentication information such as passwords. Active intrusions on the other hand are aims to disrupt the operation of the network itself allowing the intruder to bypass or break into secure systems. In this regard, active intrusions attempt to circumvent or break protection features, introduce malicious code, and to steal or modify information. These intrusions are mounted against a network backbone, exploit information in transit, electronically penetrate an enclave, or attempt to establish unauthorized communication links with the enclave. An entity's network may be vulnerable to network intrusions due to a variety of reasons including but not limited to, non-existent security architecture, un-patched client-side software and applications, phishing or targeted attacks, Internet websites, for configuration management, use of mobile devices such as laptops or handheld devices capable of connecting to the network remotely, cloud computing, removable media, or the like.

Figure 1:
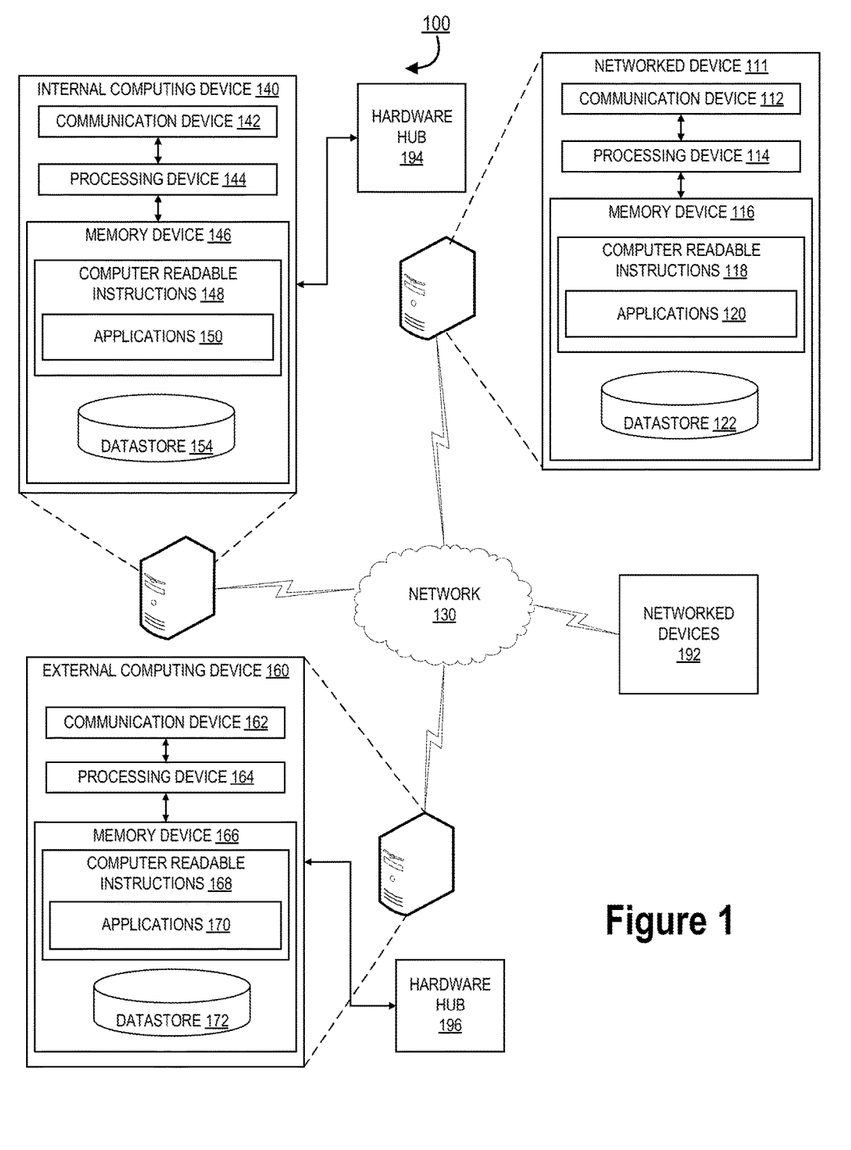
FIG. 1 illustrates a system environment for model framework and system for cyber security services, in accordance with some embodiments of the invention.

FIG. 1 illustrates a system environment 100 for model framework and system for cyber security services, in accordance with some embodiments of the invention. The environment 100 includes a networked device 111, an external computing device 160, an internal computing device 140, and one or more networked devices 192. The systems and devices communicate with one another over the network 130 and perform one or more of the various steps and/or methods according to embodiments of the disclosure discussed herein. The network 130 may include a local area network (LAN), a wide area network (WAN), and/or a global area network (GAN). The network 130 may provide for wireline, wireless, or a combination of wireline and wireless communication between devices in the network. In one embodiment, the network 130 includes the Internet.

The networked device 111, the external computing device 160, and the internal computing device 140 each includes a computer system, server, multiple computer systems and/or servers or the like. The internal computing device 140, in the embodiments shown has a communication device 142 communicably coupled with a processing device 144, which is also communicably coupled with a memory device 146. The processing device 144 is configured to control the communication device 142 such that the internal computing device 140 communicates across the network 130 with one or more other systems. The processing device 144 is also configured to access the memory device 146 in order to read the computer readable instructions 148, which in some embodiments includes a one or more applications 150 stored thereon. The memory device 146 also includes a datastore 154 or database for storing pieces of data that can be accessed by the processing device 144. In some embodiments, the datastore 154 houses sensitive data such as customer and client information, payment information, personal files, account details, or the like that requires protection. In some embodiments, the internal computing device 140 includes a hardware hub 194 configured to facilitate the connection of multiple devices or connections to be connected to the internal computing device 140. For example, a hardware hub may be a USB hub which allows multiple USB devices to be connected to one computer, even though the computer may only have a few USB connections. In doing so, the hardware hub 194 enables the transfer of data from the internal computing device 140 to a device connected via the hardware hub 194. In one aspect, the hardware hub 194 may be an ethernet hub, and active hub, a network hub, repeated hub, or any such hubs capable of connecting multiple Internet devices together and making them act as a single network segment.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 114, 144, or 164 may further include functionality to operate one or more software programs based on computer-executable program code thereof, which may be stored in a memory. As the phrase is used herein, a processing device 114, 144, or 164 may be "configured to" perform a certain function in a variety of ways, including, for example, by having one or more general-purpose circuits perform the function by executing particular computer-executable program code embodied in computer-readable medium, and/or by having one or more application-specific circuits perform the function.

Furthermore, as used herein, a "memory device" generally refers to a device or combination of devices that store one or more forms of computer-readable media and/or computer-executable program code/instructions. Computer-readable media is defined in greater detail below. For example, in one embodiment, the memory device includes any computer memory that provides an actual or virtual space to temporarily or permanently store data and/or commands provided to the processing device 114, 144, or 164 when it carries out its functions described herein. In some embodiments, any data and/or information may be stored in non-volatile memory distinct from instructions for executing one or more process steps discussed herein that may be stored in a volatile memory such as a memory directly connected or directly in communication with a processing device executing the instructions. In this regard, some or all the process steps carried out by the processing device may be executed in near-real-time, thereby increasing the efficiency by which the processing device may execute the instructions as compared to a situation where one or more of the instructions are stored and executed from a non-volatile memory, which may require greater access time than a directly connected volatile memory source. In some embodiments, one or more of the instructions are stored in a non-volatile memory and are accessed and temporarily stored (i.e., buffered) in a volatile memory directly connected with the processing device where they are executed by the processing device. Thus, in various embodiments discussed herein, the memory or memory device of a system or device may refer to one or more non-volatile memory devices and/or one or more volatile memory devices.

The networked device 111 may typically be referred to devices similar to the internal computing device 140 located within the cyberspace associated with the entity and networked to communicate with one or more other networked devices 192. The networked device 111 includes a communication device 112 operatively coupled with a processing device 114, which is also communicably coupled with a memory device 116. The processing device 114 is configured to control the communication device 112 such that the networked device 111 communicates across the network 130 with one or more other systems. The processing device 114 is also configured to access the memory device 116 in order to read the computer readable instructions 118, which in some embodiments includes an application 120. The memory device 116 also includes a datastore 122 or database for storing pieces of data that can be accessed by the processing device 114. In some embodiments, the networked device 111 may be a mobile device of the user, a back end system associated with the entity, a third party device, or another device capable of accessing the network.

The external computing device 160 includes a communication device 162 operatively coupled with a processing device 164, which is also communicably coupled with a memory device 166. The processing device 164 is configured to control the communication device 162 such that the external computing device 160 communicates across the network 130 with one or more other systems. The processing device 164 is also configured to access the memory device 166 in order to read the computer readable instructions 168, which in some embodiments includes an application 170. The memory device 166 also includes a datastore 172 or database for storing pieces of data that can be accessed by the processing device 264. In some embodiments, the external computing device 160 includes a hardware hub 196 configured to facilitate the connection of multiple devices or connections to be connected to the external computing device 160. In this regard, the hardware hub 196 may be connected in such a way that facilitates data transfer not only from the data store 172 associated with the external computing device 160, but also from data stores associated with one or more computing devices (e.g. networked device 111, internal computing device 140, or the like) and/or networked devices 192 connected via the network 130.

In some embodiments, the network devices 192 may include one or more other computing devices or physical devices required for communication and interaction between the devices on the network 130 to mediate data within the network 130. For example, a networked device may include, but is not limited to computing devices such as a personal computer, shared devices such as a printer, scanner, copier, or the like, networking hardware such as gateways, routers, bridges, modems, or the like, and/or one or more hardware hubs.

In some embodiments, the applications 120 and 150 may be any software program, or group of programs, that is designed for the end-user. In some embodiments, the applications 120 and 150 may be network software applications designed to help set up, manage, and/or monitor the network 130. In some other embodiments, the applications 120 and 150 may be software programs stored on the networked device 111 and the external computing device 160 respectively and capable of being configured to access the internal computing device 140. In this regard, the applications 120 and 150 may be configured to retrieve data from the one or more data stores associated with one or more computing devices on the network 130.

In some embodiments, the applications 150 may include a program, or a group of programs or tools configured to control and/or prohibit unauthorized access of the internal computing device 140 by one or more computing devices associated with the network 130, such as the external computing device 160, the network device 111, and/or other networked devices 192. In one aspect, the unauthorized access may refer to unauthorized access to the communication device 142, the processing device 144, the memory device 146, one or more applications 150 stored on the internal computing device 140, and/or the data store 154. Typically, unauthorized access may include viewing private accounts, messages, files or resources without prior permission from the owner/user/administrator of the internal computing device 140 to do so. Examples of unauthorized access may include but is not limited to sniffing/wiretapping/eavesdropping on network traffic, exploiting security weaknesses by using vulnerability assessment tools to probe network systems, Internet protocol (IP) spoofing, obstructing computer services by placing malicious programs either within the computing device, or in one or more data paths associated with the computing device, placing the back door that enables intruders to come back to the system at a later date, installing malicious programs such as viruses to edit, modify, and/or delete data stored on the computing device, insert an undetectable program into an authorized application to retrieve sensitive information, and/or the like.

The present invention provides the functional benefit of establishing tools and controls at various locations within the network to control and prohibit unauthorized access by external computing devices and/or network devices. In this regard, the present invention is capable of determining one or more access paths to the assets (e.g., devices, data, networks, and any other resources key to the functioning of the entity's cyberspace) associated with the internal computing device 140 and establish controls capable of being configured to regulate and prohibit access to the assets.

For purposes of the invention, the application 150 associated with the internal computing device 140 may be configured for instructing the processing device 144 to perform various steps of the methods discussed herein, and/or other steps and/or similar steps. In various embodiments, one or more of the applications 120, 150, and 170 are included in the computer readable instructions stored in a memory device of one or more systems or devices other than the systems 160 and 140 and the networked device 111. For example, in some embodiments, the application 120 is stored and configured for being accessed by a processing device of one or more networked devices 192 connected to the network 130. In various embodiments, the applications 120, 150, and 170 stored and executed by different systems/ devices are different. In some embodiments, the applications 120, 150, and 170 stored and executed by different systems may be similar and may be configured to communicate with one another, and in some embodiments, the applications 120, 150, and 170 may be considered to be working together as a singular application despite being stored and executed on different systems.

In various embodiments, one of the systems discussed above, such as the internal computing device 140, is more than one system and the various components of the system are not collocated, and in various embodiments, there are multiple components performing the functions indicated herein as a single device. For example, in one embodiment, multiple processing devices perform the functions of the processing device 144 of the internal computing device 140 described herein.

In various embodiments, the internal computing device 140, the external computing device 160, and the networked device 111 and/or other systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of method 300, the other methods discussed below, or other methods, processes or steps discussed herein or not discussed herein.

Figure 2:
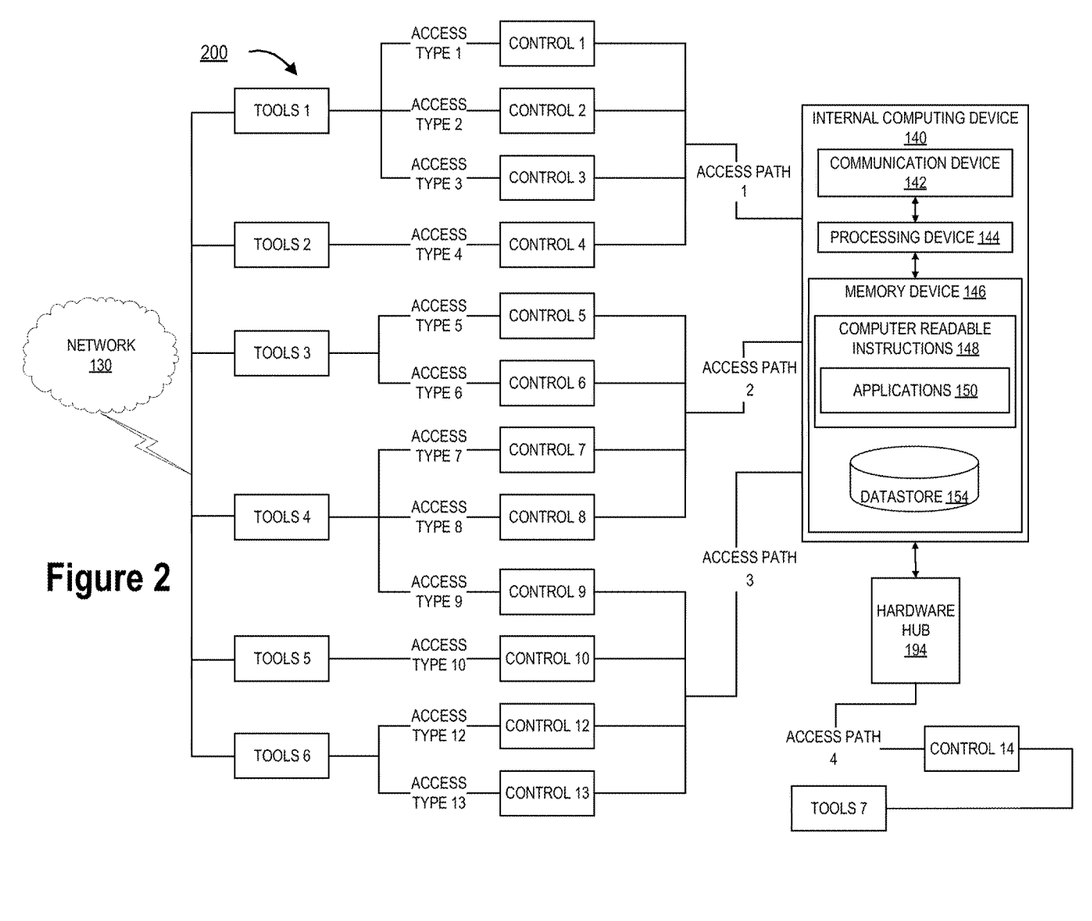
FIG. 2 illustrates a data environment showing one or more tools and access paths to the internal computing device, in accordance with an embodiment of the invention.

FIG. 2 illustrates a data environment 200 showing one or more tools and access paths to the internal computing device 140, in accordance with an embodiment of the invention. For purposes of the invention, the assets that require protection within a networking environment are described in terms of data stored within the network and/or the internal computing device 140. As used herein, "data" may refer to both logical data and physical data. The logical aspect of data is what the data means. The physical aspect of data is the medium in which the data is stored. Typically, logical data has a structure that is used to represent its meaning and some form of classification. Since logical data cannot exist except in some physical form, the relationship between logical data and physical data is a "using" relationship.

As shown in FIG. 2, the data environment 200 includes one or more access paths (access path 1, access path 2, and access path 3) specifying one or more paths that can be chosen by an external computing device (or any device connected to the network 130) to retrieve data from an internal computing device 140. In some embodiments, each access path involves authorization to access one or more data repositories (e.g. datastores 154) associated with the internal computing device 140. In some other embodiments, each access path involves authorization to access one or more applications 150 stored on the internal computing device 140. For example, administrators may have the ability to remove, edit and add data, while general users may not even have "read" rights if they lack access to particular information. As shown in FIG. 2, the data environment 200 includes an access path (access path 4) via a hardware hub 194 associated with the internal computing device 140.

In some embodiments, the data environment 200 includes one or more controls associated with each access path. Typically, in the field of information security, a control is safeguard or countermeasure to avoid, detect, counteract, or minimize security exposure. The one or more controls may be regulated to determine access authorization and distinguish the abilities of administrators and users. For example, administrators may have the ability to remove, edit and add data, while general users may not even have "read" rights if they lack access to particular information. In other words, the one or more controls may be regulated to identify, protect, detect (a threat to), respond (to a threat to), or recover the data.

In some embodiments, the one or more access paths may include one or more access types. The one or more access types may include one or more ways in which an external computing device 160 may access the internal computing device 140 via the one or more access paths. In one aspect, each access type may be associated with a control to regulate access to the internal computing device 140 via an access path. In another aspect, one or more access types may be associated with a control to regulate access to the internal computing device 140 via an access path. In yet another aspect, each access type may be associated with one or more controls to regulate access to the internal computing device 140 via an access path.

In some embodiments, the data environment 200 include one or more tools to regulate the controls to monitor access to the internal computing device. The one or more tools may be both software tools and/or hardware tools, and that, the one or more tools are used to prevent, detect, and remove unauthorized access to the internal computing device 140. In this regard, the tools may be computer software used to protect the internal computing device 140 from malicious browser helper objects, browser hackers, keyloggers, rootkits, fraudtools, or the like, or security devices such as biometric computer security devices (iris detector, fingerprint scanner, gait analysis, or the like), port security device (e.g., USB security device), or the like. In one aspect, the tools may include one or more capabilities to facilitate the regulation of the controls to detect and prohibit access to the internal computing device 140 via the one or more access paths. Typically, a capability may be defined as an aptitude or competency that an entity may possess or require at an entity, business function, or individual level that has the potential, or is required to contribute to a business outcome thereby creating value. For example, the control is a type of capability that has a control objective. In some embodiments, the system may be configured to assign a tool to each access type thereby regulating a control associated with an access path. In some other embodiments, the system may be configured to assign a tool to one or more access types thereby regulating one or more controls associated with an access path. In one aspect, the system may be configured to assign a tool capable of regulating one or more controls associated with multiple access paths simultaneously. Similarly, the data environment 200 includes a tool capable of regulating a control to determine access to the hardware hub 194 associated with the internal computing device 140.

Figure 3:
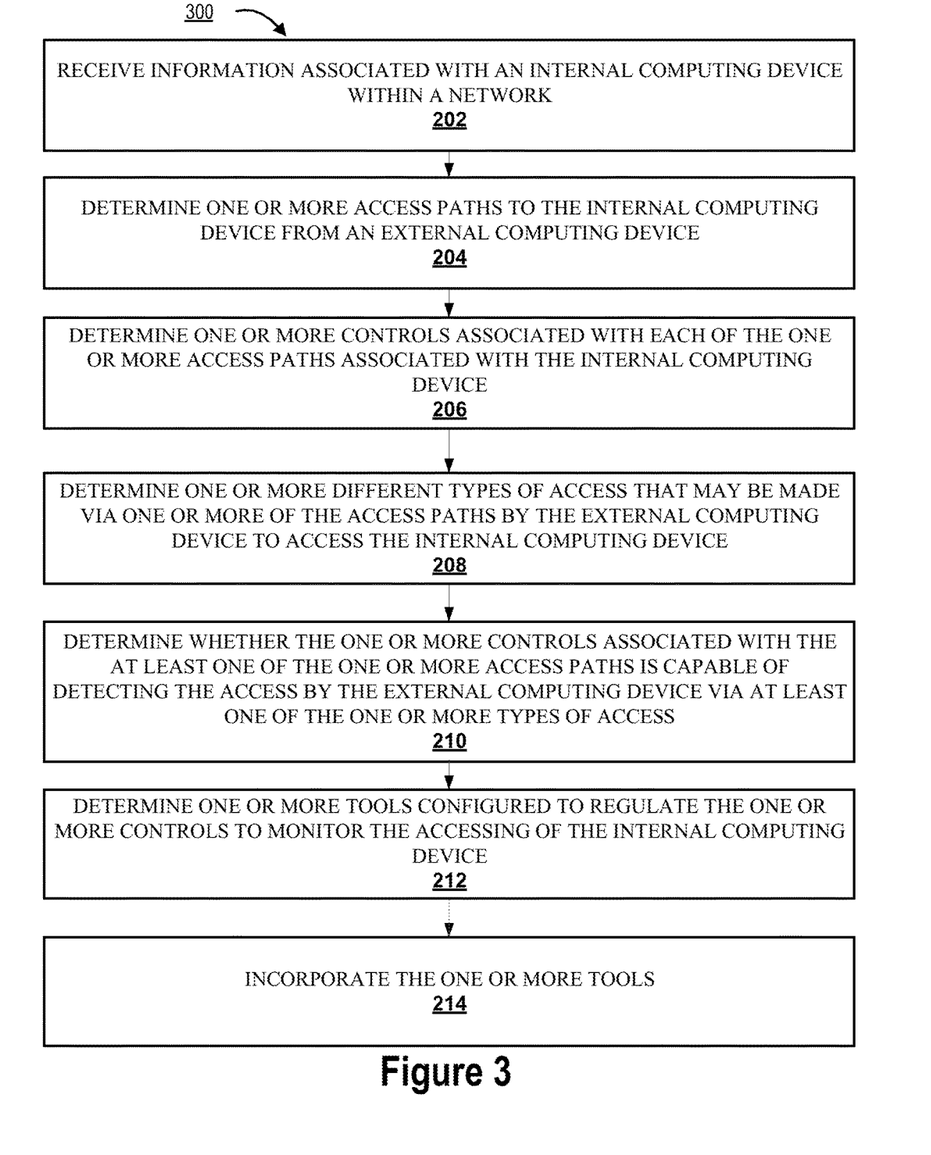
FIG. 3 illustrates a process flow for model framework and system for cyber security services, in accordance with some embodiments of the invention

FIG. 3 illustrates a process flow for model framework and system for cyber security services, in accordance with some embodiments of the invention. As shown in block 202, the process flow includes electronically receiving information associated with an internal computing device within the network. In some embodiments, the information associated with the internal computing device may include but is not limited to one or more software applications stored on the internal computing device, one or more ports located thereon, one or more data repositories associated with the internal computing device, one or more networks associated with the internal computing device, one or more peripheral devices connected to the internal computing device, one or more data paths to and from the internal computing device, one or more network devices connected to one or more networks associated with the internal computing device, one or more tools associated with the internal computing device, and/or the like. This information may be received from a distributed network of servers connected directly or indirectly to the internal computing device, thereby providing complete information associated with at least one or more data paths to and from the internal computing device.

Next, as shown in block 204, the process flow includes determining one or more access paths to the internal computing device from an external computing device. In some embodiments, the external computing device may refer to any device directly or indirectly connected to the internal computing device attempting to gain access to the internal computing device. In one aspect, the access may be authorized and regulated access. In another aspect, the access may be unauthorized access. As described herein, the one or more access paths specifies one or more paths that can be chosen by the external computing device to retrieve data from an internal computing device.

Next, as shown in block 206, the process flow includes determining one or more controls associated with each of the one or more access paths associated with the internal computing device. In one aspect, the one or more controls may be configured to determine access to the internal computing device. As described herein, the one or more controls may be regulated to determine access authorization and distinguish the abilities of administrators from users. In this regard, the one or more controls may be configured to regulate network traffic associated with the internal computing device to detect and prohibit access to the internal computing device.

Next, as shown in block 208, the process flow includes determining one or more different types of access that may be made via one or more of the access paths by the external computing device to access the internal computing device. In some embodiments, the one or more access types may include one or more ways in which an external computing device may access the internal computing device via the one or more access paths. For example, an internal computing device may be accessed by an email application (access path) capable of facilitating the transfer of data from the internal computing device to one or more devices connected to the network (e.g., Internet, LAN, WAN, or the like). An external computing device attempting to access the internal computing device in this case may be in the form malware to either disrupt computer operations, gather sensitive information, gain access to private computer systems, or display unwanted advertising. The one or more access types in this case may specify one or more ways the malware may gain unauthorized access to the internal computing device, including, but is not limited to, email text, attachments, hyperlinks in the subject line/body of the email, or the like.

Next, as shown in block 210, the process flow includes determining whether the one or more controls associated with the at least one of the one or more access paths is capable of detecting the access by the external computing device via at least one of the one or more types of access. Continuing with the previous example, the system may be configured to determine whether the one or more controls associated with the email application access path is capable of detecting the access via the different access types, specifically, email text, attachments, hyperlinks in the subject line/body of the email, or the like.

Next, as shown in block 212, the process flow includes determining one or more tools configured to regulate the one or more controls to monitor the accessing of the internal computing device. In response, the system may then incorporate the one or more tools within the network to regulate the one or more controls to detect and monitor the accessing of the internal computing device by the external computing device via at least one of the one or more types of access, as shown in block 214.

In some embodiments, the system may be configured to determine that the one or more controls associated with at least one of the one or more access paths is not capable of detecting the access by the external computing device via at least one of the one or more types of access. In this regard, the system may determine that the one or more controls is not capable of regulating the one or more conditions associated with the one or more types of access. For example, the system may determine that while an antivirus software stored on the internal computing device may scan text and hyperlinks in the subject line/body of the email, the antivirus software does not scan attachments. In response, the system may determine one or more capabilities associated with the one or more types of access incapable of being regulated by the one or more controls. In this regard, the system may be configured to choose from a list of defensive capabilities associated with intrusion prevention and detection to determine which of the one or more capabilities are required to enable the one or more controls need to be configured for regulating access by the external computing device via at least one of the one or more types of access previously incapable of being regulated.

In response, the system may be configured to identify one or more tools based on at least the one or more determined capabilities to facilitate the regulation of the one or more controls to detect and prohibit access to the internal computing device via at least one of the one or more types of access. Once the tools are identified, the system may then incorporate the one or more identified tools within the network to regulate the one or more controls to detect and monitor the accessing of the internal computing device by the external computing device via at least one of the one or more types of access previously not capable of detecting the access.

In some embodiments, the access to the internal computing device by the external computing device via at least one of the one or more types of access causes a loss event. Typically, an event is a single occurrence within the network environment, usually involving an attempted change of state. An event usually includes the notion of time, the occurrence, and any details that explicitly pertains to the event or the network environment that may help explain or understand the events causes or effects. Specifically, a loss event is an event that reduces the value of an asset or that creates a liability. The system may then determine a probability score associated with the loss event indicating the chances of occurrence of the loss event. In addition, the system may also determine a magnitude of impact score associated with the loss event indicating a consequence of the loss event. In combination, the system may determine an exposure score associated with the loss event based on both the probability score and the magnitude of impact score. By identifying tools and regulating controls, the present invention provides the functional benefit of detecting and prohibiting access to the internal computing device via at least one of the one or more types of access, thereby reducing the exposure score associated with the loss event. In one aspect, the tools identified may assist in reducing either the probability score or the magnitude of impact score thereby contributing to the reduction of the exposure score. In another aspect, the tools identified may assist in reducing both the probability score and the magnitude of impact score thereby contributing to the reduction of the exposure score.

In some embodiments, the system may be configured to determine that the exposure score associated with the loss event is greater than a predetermined threshold. In this regard, the predetermined threshold may be used to indicate when an event becomes a threat event, and rises to the level of a loss event. Typically, a threat event is an event that can, but does not necessarily cause loss to materialize. The system may then identify one or more tools based on certain specific capabilities to facilitate the regulation of controls to detect and prohibit access to the internal computing device by the external computing device. In doing so, the system may be able to determine whether the incorporation of such tools results in an exposure score associated with the loss event that is lower than the predetermined threshold. As either the probability score or the magnitude of impact score is mitigated using the one or more identified tools, a certain level of exposure may be deemed acceptable. The exposure gap is the exposure that is yet to be mitigated because it is beyond the bounds of what can be accepted.

In some embodiments, the system may determine that a first tool identified to facilitate the regulation of one or more controls comprises capabilities that overlap with the capabilities of a second tool also identified to facilitate the regulation of the controls. In such cases, the system may be configured to initiate a presentation of a user interface for display on a user device to enable a user to select the first tool or the second tool for the one or more overlapped capabilities. In this regard, the user device, for example, may include a personal computer system (e.g. a non-mobile or non-portable computing system, or the like), a mobile computing device, a personal digital assistant, a mobile phone, a tablet computing device, a network device, and/or the like. In accordance with some embodiments of the present invention, the user device may include a communication interface, a processor, a memory having an user application stored therein, and a user interface. In such embodiments, the communication interface is operatively and selectively connected to the processor, which is operatively and selectively connected to the user interface and the memory. In some embodiments, the user may use the user application to execute processes described with respect to the process flows described above. Specifically, the user application executes the process flows described herein. In some embodiments, the user device may be a stand-alone device that is typically not connected to the network 130 associated with the internal computing device and/or the external computing device. In one aspect, the incorporation of the one or more tools may require user intervention to determine which of the identified tools are used in the regulation of the controls. To do that, the system may be configured to establish a communication link with the user device thereby creating a wireless and/or wired data channel between the system and the user device such that the application stored on the user device is initiated to display the user interface. In doing so, the user device which previously was not connected to the network 130, is then connected to the network 130. In response, the system may then be configured to receive a user input comprising the selection of the first tool and/or the second tool for the overlapped capabilities. Once the user selection is received, the system may be configured to then incorporate the first tool and the second tool within the network to regulate the one or more controls to detect and prohibit access to the internal computing device by the external computing device.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, or the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a verity of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, or the like) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A model framework and system for cyber security services, the system comprising:
   at least one non-transitory storage device;
   at least one processor; and
   at least one module stored in said storage device and comprising instruction code that is executable by the at least one processor and configured to cause said at least one processor to:
   electronically receive, via a distributed network of servers, information associated with an internal computing device within a network;
   determine one or more access paths to the internal computing device from an external computing device;
   determine one or more controls associated with each of the one or more access paths associated with the internal computing device, wherein the one or more controls are configured to determine access to the internal computing device;
   determine one or more types of access that may be made via one or more of the access paths by the external computing device to access the internal computing device;
   determine that the one or more controls associated with the at least one of the one or more access paths is not capable of detecting the access by the external computing device via at least one of the one or more types of access, wherein determining further comprises determining that the one or more controls is not capable of regulating one or more conditions associated with the one or more types of access;
   determine one or more capabilities associated with the one or more types of access, the one or more types of access incapable of being regulated by the one or more controls;
   identify one or more tools based on at least the one or more determined capabilities, wherein the one or more identified tools facilitate a regulation of the one or more controls to detect and prohibit access to the internal computing device via at least one of the one or more types of access; and
   incorporate the one or more identified tools within the network to regulate the one or more controls to detect and monitor the accessing of the internal computing device by the external computing device via at least one of the one or more types of access previously not capable of detecting the access.

2. The system of claim 1, wherein the module is further configured to cause the at least one processor to:
   determine that access to the internal computing device by the external computing device via at least one of the one or more types of access causes a loss event;
   determine a probability score associated with the loss event, wherein the probability score indicates chances of occurrence of the loss event;
   determine a magnitude of impact score associated with the loss event, wherein the magnitude of impact score indicates a consequence of the loss event; and
   determine an exposure score associated with the loss event based on at least the probability score and the magnitude of impact score.

3. The system of claim 2, wherein the one or more controls are configured to be regulated to detect and prohibit access to the internal computing device via at least one of the one or more types of access, thereby reducing the exposure score associated with the loss event.

4. The system of claim 2, wherein the module is further configured to cause the at least one processor to:
   determine that the exposure score associated with the loss event is greater than a predetermined threshold;
   determine one or more capabilities associated with the one or more types of access, the one or more types of access incapable of being regulated by the one or more controls;
   identify one or more tools based on at least the one or more determined capabilities, wherein the one or more identified tools facilitate the regulation of the one or more controls to detect and prohibit access to the internal computing device by the external computing device; and
   incorporate the one or more identified tools within the network to regulate the one or more controls to detect and prohibit access to the internal computing device by the external computing device, wherein the incorporation of the one or more identified tools results in the exposure score associated with the loss event to be lower than the predetermined threshold.

5. The system of claim 1, wherein the module is further configured to cause the at least one processor to:

determine that a first tool identified to facilitate the regulation of the one or more controls comprises one or more capabilities that overlap with the capabilities of a second tool also identified to facilitate the regulation of the one or more controls, wherein the first tool and the second tool associated with the one or more tools identified;

initiate a presentation of a user interface to enable a user to select the first tool or the second tool for the one or more overlapped capabilities;

receive a user input comprising a selection of the first tool and/or the second tool for the one or more overlapped capabilities; and incorporate the first tool and the second tool within the network to regulate the one or more controls to detect and prohibit access to the internal computing device by the external computing device.

6. A computerized method for a model framework and system for cyber security services, the method comprising:

electronically receiving, via a distributed network of servers, information associated with an internal computing device within a network;

determining, using a computing device processor, one or more access paths to the internal computing device from an external computing device;

determining, using a computing device processor, one or more controls associated with each of the one or more access paths associated with the internal computing device, wherein the one or more controls are configured to determine access to the internal computing device;

determining, using a computing device processor, one or more types of access that may be made via one or more of the access paths by the external computing device to access the internal computing device;

determining, using a computing device processor, that the one or more controls associated with the at least one of the one or more access paths is not capable of detecting the access by the external computing device via at least one of the one or more types of access, wherein determining further comprises determining that the one or more controls is not capable of regulating one or more conditions associated with the one or more types of access;

determining, using a computing device processor, one or more capabilities associated with the one or more types of access, the one or more types of access incapable of being regulated by the one or more controls;

identifying, using a computing device processor, one or more tools based on at least the one or more determined capabilities, wherein the one or more identified tools facilitate a regulation of the one or more controls to detect and prohibit access to the internal computing device via at least one of the one or more types of access; and incorporating, using a computing device processor, the one or more identified tools within the network to regulate the one or more controls to detect and monitor the accessing of the internal computing device by the external computing device via at least one of the one or more types of access previously not capable of detecting the access.

7. The method of claim 6, wherein the method further comprises:

determining that access to the internal computing device by the external computing device via at least one of the one or more types of access causes a loss event;

determining a probability score associated with the loss event, wherein the probability score indicates chances of occurrence of the loss event;

determining a magnitude of impact score associated with the loss event, wherein the magnitude of impact score indicates a consequence of the loss event; and determining an exposure score associated with the loss event based on at least the probability score and the magnitude of impact score.

8. The method of claim 7, wherein the one or more controls are configured to be regulated to detect and prohibit access to the internal computing device via at least one of the one or more types of access, thereby reducing the exposure score associated with the loss event.

9. The method of claim 7, wherein the method further comprises:

determining that the exposure score associated with the loss event is greater than a predetermined threshold;

determining one or more capabilities associated with the one or more types of access, the one or more types of access incapable of being regulated by the one or more controls;

identifying one or more tools based on at least the one or more determined capabilities, wherein the one or more identified tools facilitate the regulation of the one or more controls to detect and prohibit access to the internal computing device by the external computing device; and incorporating the one or more identified tools within the network to regulate the one or more controls to detect and prohibit access to the internal computing device by the external computing device, wherein the incorporation of the one or more identified tools results in the exposure score associated with the loss event to be lower than the predetermined threshold.

10. The method of claim 6, wherein the method further comprises:

determining that a first tool identified to facilitate the regulation of the one or more controls comprises one or more capabilities that overlap with the capabilities of a second tool also identified to facilitate the regulation of the one or more controls, wherein the first tool and the second tool associated with the one or more tools identified;

initiating a presentation of a user interface to enable a user to select the first tool or the second tool for the one or more overlapped capabilities;

receiving a user input comprising a selection of the first tool and/or the second tool for the one or more overlapped capabilities; and incorporating the first tool and the second tool within the network to regulate the one or more controls to detect and prohibit access to the internal computing device by the external computing device.

11. A non-transitory computer program product for a model framework and system for cyber security services, the computer program product comprising a non-transitory computer-readable medium comprising code causing a first apparatus to:

electronically receive, via a distributed network of servers, information associated with an internal computing device within a network;

determine one or more access paths to the internal computing device from an external computing device;

determine one or more controls associated with each of the one or more access paths associated with the internal computing device, wherein the one or more controls are configured to determine access to the internal computing device;

determine one or more types of access that may be made via one or more of the access paths by the external computing device to access the internal computing device;

determine that the one or more controls associated with the at least one of the one or more access paths is not capable of detecting the access by the external computing device via at least one of the one or more types of access, wherein determining further comprises determining that the one or more controls is not capable of regulating one or more conditions associated with the one or more types of access;

determine one or more capabilities associated with the one or more types of access, the one or more types of access incapable of being regulated by the one or more controls;

identify one or more tools based on at least the one or more determined capabilities, wherein the one or more identified tools facilitate a regulation of the one or more controls to detect and prohibit access to the internal computing device via at least one of the one or more types of access; and incorporate the one or more identified tools within the network to regulate the one or more controls to detect and monitor the accessing of the internal computing device by the external computing device via at least one of the one or more types of access previously not capable of detecting the access.

12. The computer program product of claim 11, wherein the first apparatus is further configured to:

determine that access to the internal computing device by the external computing device via at least one of the one or more types of access causes a loss event;

determine a probability score associated with the loss event, wherein the probability score indicates chances of occurrence of the loss event;

determine a magnitude of impact score associated with the loss event, wherein the magnitude of impact score indicates a consequence of the loss event; and determine an exposure score associated with the loss event based on at least the probability score and the magnitude of impact score.

13. The computer program product of claim 12, wherein the first apparatus is further configured to:

determine that the exposure score associated with the loss event is greater than a predetermined threshold;

determine one or more capabilities associated with the one or more types of access, the one or more types of access incapable of being regulated by the one or more controls;

identify one or more tools based on at least the one or more determined capabilities, wherein the one or more identified tools facilitate the regulation of the one or more controls to detect and prohibit access to the internal computing device by the external computing device; and incorporate the one or more identified tools within the network to regulate the one or more controls to detect and prohibit access to the internal computing device by the external computing device, wherein the incorporation of the one or more identified tools results in the exposure score associated with the loss event to be lower than the predetermined threshold.

14. The computer program product of claim 11, wherein the first apparatus is further configured to:

determine that a first tool identified to facilitate the regulation of the one or more controls comprises one or more capabilities that overlap with the capabilities of a second tool also identified to facilitate the regulation of the one or more controls, wherein the first tool and the second tool associated with the one or more tools identified;

initiate a presentation of a user interface to enable a user to select the first tool or the second tool for the one or more overlapped capabilities;

receive a user input comprising a selection of the first tool and/or the second tool for the one or more overlapped capabilities; and incorporate the first tool and the second tool within the network to regulate the one or more controls to detect and prohibit access to the internal computing device by the external computing device.

* * * * *